United States Patent [11] 3,546,370

[72] Inventor James L. Kimball
La Mesa, California
[21] Appl. No. 606,822
[22] Filed Jan. 3, 1967
[45] Patented Dec. 8, 1970
[73] Assignee Cohu Electronics, Inc.
San Diego, California
a corporation of California

[54] LUMINANCE CORRECTOR FOR COLOR ENCODER
16 Claims, 8 Drawing Figs.

[52] U.S. Cl. 178/5.4
[51] Int. Cl. H04n 9/08
[50] Field of Search 178/5.2, 5.4, 5.44(TCC)

[56] References Cited
UNITED STATES PATENTS

| | | | |
|---|---|---|---|
| 3,089,978 | 5/1963 | Bendell et al. | 178/5.4X |
| 3,196,205 | 7/1965 | Bedford | 178/5.4(4TCC) |
| 3,272,916 | 9/1966 | James et al. | 178/5.4(4TCC) |
| 3,281,528 | 10/1966 | James | 178/5.4(4TCC) |
| 3,340,356 | 9/1967 | James | 178/5.4(4TCC) |

*Primary Examiner*—Richard Murray
*Assistant Examiner*—Richard P. Lange
*Attorney*—Lyon and Lyon

ABSTRACT: A television color encoder having four image conversion tubes for producing red, green, blue and monochrome video signals, together with an adjustable time constant network by means of which the luminance signal is determined by the Y signal during steady state operation and by the monochrome signal during luminance transition periods.

INVENTOR.
JAMES L. KIMBALL
BY Lyon & Lyon
ATTORNEYS

INVENTOR.
JAMES L. KIMBALL

BY Lyon & Lyon
ATTORNEYS

INVENTOR.
JAMES L. KIMBALL

BY Lyon & Lyon
ATTORNEYS

LUMINANCE CORRECTOR FOR COLOR ENCODER

BACKGROUND OF THE INVENTION

This invention relates to the color television art and more particularly to an encoder for generating a video color signal having chrominance and luminance components.

In many color television systems, three image conversion tubes such as vidicons are used in conjunction with a beam splitter to produce outputs proportional to the red, green and blue color components of the image being viewed. After gamma correction the three color signals are matrixed to form Y, I, and Q signals for encoding into a standard FCC colored signal. According to present theory, it is the luminance or Y signal, which determines the resolution, transient response and noise of the picture while the I and Q or chrominance signals convey the color information. Of course, the luminance signal completely determines the quality of the compatible signal as displayed by a black and white receiver. Since the Y or luminance signal, is formed by adding 30 percent of the red signal, 59 percent of the green and 11 percent of the blue, the sharpness of the pictures derived from the luminance signal will depend on the closeness of registration of the three color signals of which it is composed. Because of imperfect optical alignment, scan raster size variations and scan geometric differential distortion resulting in nonsimultaneous scan of corresponding points on the three images it is very difficult to obtain and maintain accurate enough registration, and it has therefore been proposed that a four image conversion tube system be used, one of the tubes having the sole function of producing the luminance signal.

In the four tube systems that have been proposed, the same kind of matrix is used as in the three tube system to form the I and Q signals but the Y signal is disconnected, and the output M of the fourth or monochrome tube is fed directly to a combiner where it is combined with the I and Q signals to form the encoded signal. It has been found that a system of this type produces pictures having greater sharpness, particularly where severe misregistration is present.

However, direct substitution of the video signal $E_M$ from the monochrome image conversion tube for the video signal $E_Y$ produced by addition of fractions of the video signals $E_R$ $E_G$ $E_B$ from the red, green and blue image conversion tubes produces inaccurate color rendition if the gamma of the signals is different from unity. It is generally desirable that the output light be proportional to the input light; that is, unity system gamma. The phosphors of the picture tube have a gamma quite far from unity, about 2.2, and it is therefore customary to encode and transmit signals having precorrected gamma.

SUMMARY OF THE INVENTION

According to the present invention, a system is provided for obtaining the advantages of both correct color rendition and resolution of fine details. In describing the invention, the NTSC type composite color signal is assumed but it should be understood that the invention would be equally useful in any other type luminance-chrominance transmission system where the gamma is not unity at the point of encoding. This concurrent achievement of the correct color rendition of a three-tube system and the resolution of a four-tube system is accomplished by providing a luminance corrector to which both the Y and the M signals are fed and which in turn feeds an output signal to the combiner to be combined with the I and Q signals. In its most simple form, the luminance corrector takes the form of an RC time constant network, the Y signal being fed through a resistor and the M signal being fed through a capacitor to a summing junction where a corrected signal M′ results. By means of this circuit, the signal M′ has the rise times associated with M which permits resolving the detail in the picture but whose value is determined by the color components from which Y is derived when the luminance is not changing. The transition from one condition to the other is smoothly exponential. Preferably, the resistor is made adjustable to allow optimization for the degree of image misregistration.

It is therefore an object of the present invention to provide a luminance corrector for a color television encoder.

DESCRIPTION OF THE INVENTION

Figures 1, 2:
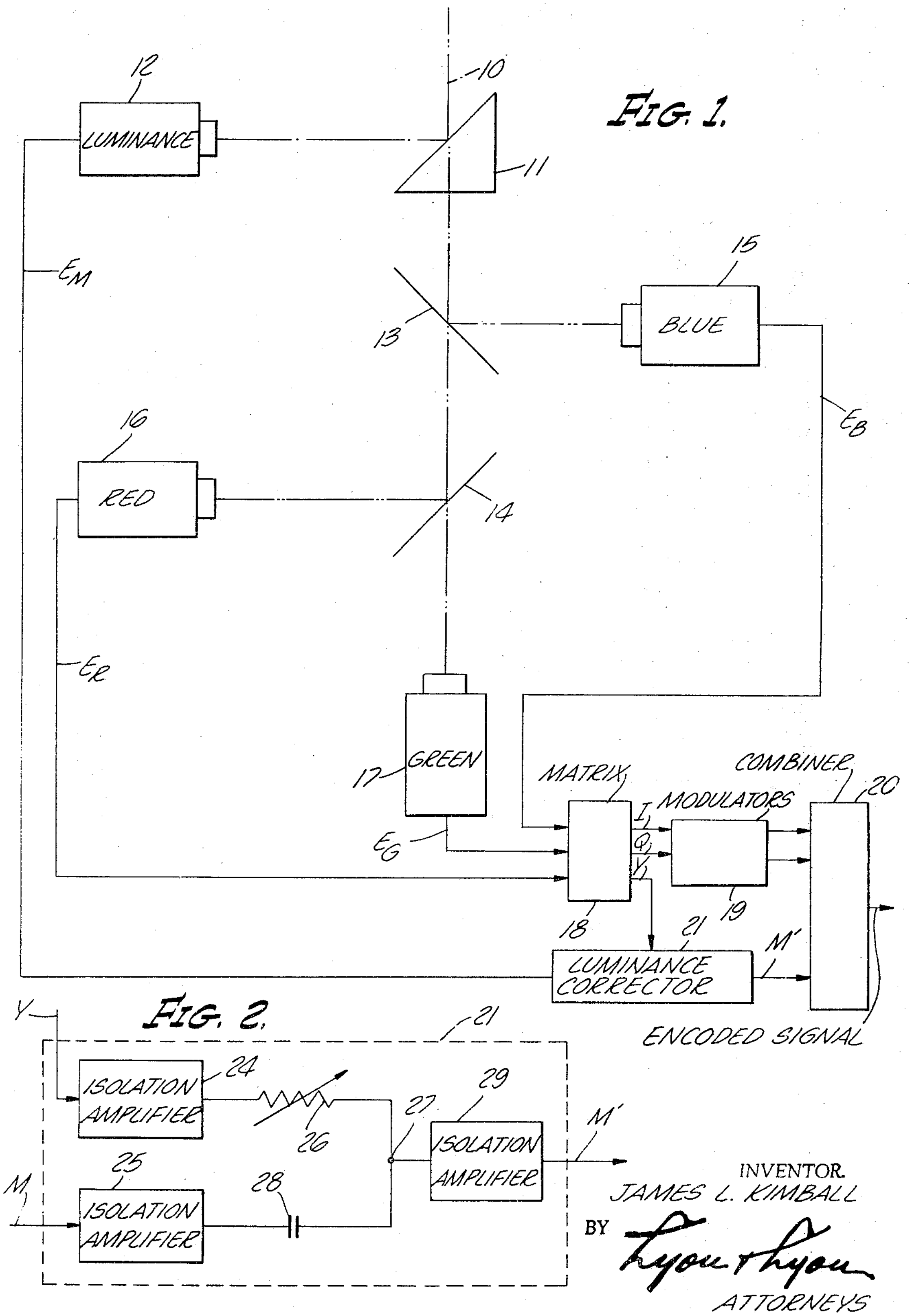
FIG. 1 is a block diagram of the overall system of the present invention.
FIG. 2 is a schematic diagram of a first embodiment of the luminance corrector shown in FIG. 1.

Turning now to FIG. 1, there is shown a color television camera system according to the present invention. The incoming image, indicated by the line 10, is partially reflected by a beam splitter prism 11 onto a first image conversion tube 12 which serves as the monochrome tube and produces an output signal M. The remainder of the incoming light is passed through the beam splitter 11 onto dichroic mirrors 13 and 14. The dichroic mirror 13 reflects the blue component of the light into an image conversion tube 15 which produces an output signal $E_B$ —the blue video signal. The mirror 13 passes the red and green components of the image, the red component being reflected by the dichroic mirror 14 into the image conversion tube 16 which produces as its output the red video signal $E_R$. The green component of the image passes through the mirror 14 into a fourth image conversion tube 17 which produces as its output the green video signal $E_G$. The image conversion tubes 12, 15, 16 and 17 may be of any desired type, for example, vidicons.

The outputs of these tubes are fed to a conventional matrix 18 which produces the standard Y, I and Q signals. The I and Q signals are passed in the conventional manner through modulators 19 to a combiner 20 of conventional design. However, the Y signal is not also passed to the combiner but rather, is passed to one input of a luminance corrector 21. The other input of the luminance corrector receives the output M of the monochrome tube 12. The luminance corrector acts in a manner to be described below to produce an output signal M′ which is fed to the combiner 20 for processing whereby the combiner 20 produces a standard NTSC encoded signal. The signal M′ produced by the luminance corrector 21 is primarily determined by the color components from which the Y signal is derived when the luminance is constant or in the steady state condition but is determined by the output of the monochrome tube 12 when the luminance is changing.

Turning now to FIG. 2, there is shown a first embodiment of a luminance corrector according to the present invention. In this embodiment, the luminance corrector 21 has a first isolation amplifier 24 to which the Y signal is applied and a second isolation amplifier 25 to which the M signal is applied. The output of the isolation amplifier 24 is connected through a variable resistance 26 to a summing junction 27 while the output of the isolation amplifier 25 is connected through a capacitor 28 to the summing junction 27. The signal appearing at the summing junction 27 is passed through an isolation amplifier 29 and emerges from the luminance collector 21 as the signal M′ which is applied to the combiner 20. From this circuit it can be seen that the operation specified above is achieved, that is, that the signal M′ is determined by the Y signal as in a conventional three-tube system during steady-state operation and yet has the rise times associated with the signal M during changes in luminance. The transition from one condition to the other is smoothly exponential with adjustment of the time constant of the network accomplished by varying resistor 26. Such adjustability allows optimization for the degree of image misregistration.

Small values of $R_26$ and of $T = R_26\ C_28$ correspond to optimization for small registration errors. As image registration becomes degraded, the value of the resistor 26 (and the time constant T) is increased to optimize the resultant image. The time constant of the RC network shown in FIG. 2 is the important characteristic. A value of less than 1 microsecond ($10^{-6}$ second) is appropriate. For very well registered systems, a time constant of as little as 30 nanoseconds ($30\times10^{-9}$ second) will be more nearly optimum. Typically, a value between one and two-tenths microsecond ($0.1-0.2\times10^{-6}$ second) will be optimum. A value for the resistance 26 of between 100 and 10,000 ohms is suitable with appropriate corresponding values of capacitance. Of course, either or both the resistance or capacitance can be adjustable.

The isolation amplifiers 24, 25 and 29 are conventional and can be any of a number of configurations. The quality required of these amplifiers is determined by other considerations as will be apparent to those skilled in the art and these amplifiers may serve other functions, i.e., as emitter followers. It is also possible to use operational amplifiers in place of the isolation amplifiers shown. The signal polarity inversion produced by the use of operational amplifiers is corrected by using them in all three places, that is, reinversion takes place. If some other portion of the encoder inverts the signal, then an appropriate one of the three could be made an operational amplifier to reinvert the signal. The RC network form and values could remain unchanged.

Figure 3:
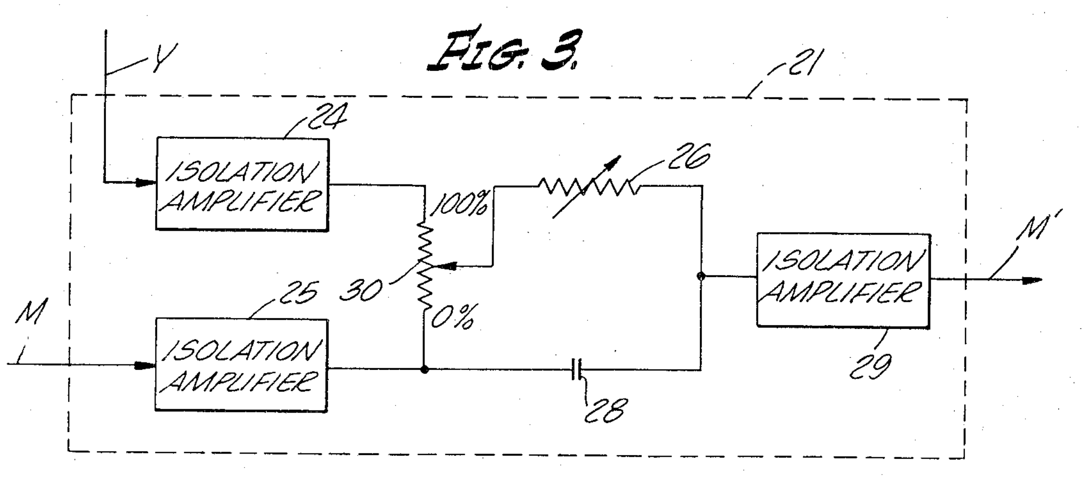
FIG. 3 is schematic diagram of a second embodiment of the luminance corrector shown in FIG. 1.
Figure 4:
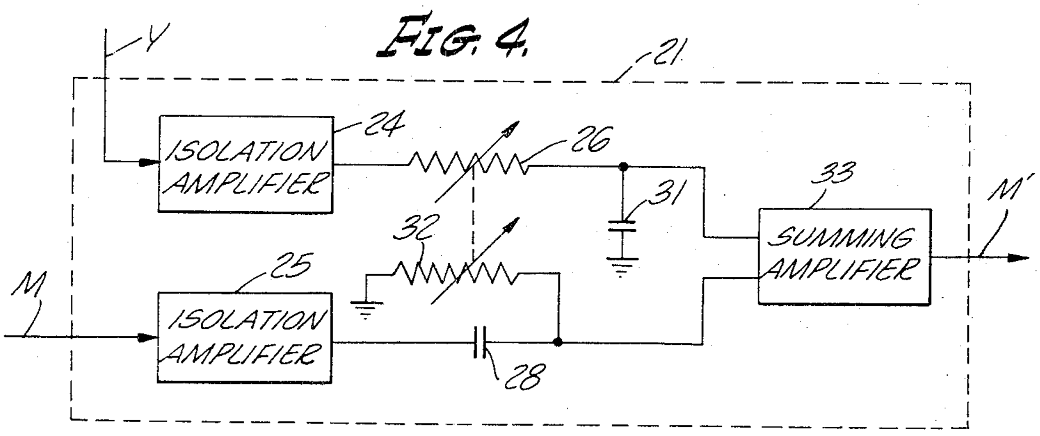
FIG. 4 is a schematic diagram of a third embodiment of the luminance corrector shown in FIG. 1.

FIGS. 3, 4, 5 and 6 show other forms that the luminance corrector 21 can take. The circuit of FIG. 3 is in all respects similar to that of FIG. 2 with the exception that a percent correction control potentiometer 30 is provided. In FIG. 4 the resistor 26 is provided with a grounded capacitor 31 and the capacitor 28 provided with a grounded resistor 32 so that each circuit path for the signals I and M has its own time constant network. These circuit paths are applied to the inputs of a summing amplifier 33 which produces the signal M'. The resistors 26 and 32 are both adjustable and are ganged for simultaneous adjustment. As will be obvious to those skilled in the art, the time constants of the networks $R_{26}\ C_{31}\ R_{32}\ C_{28}$ are selected to achieve the same results as the circuits shown in FIG. 2.

Figure 5:
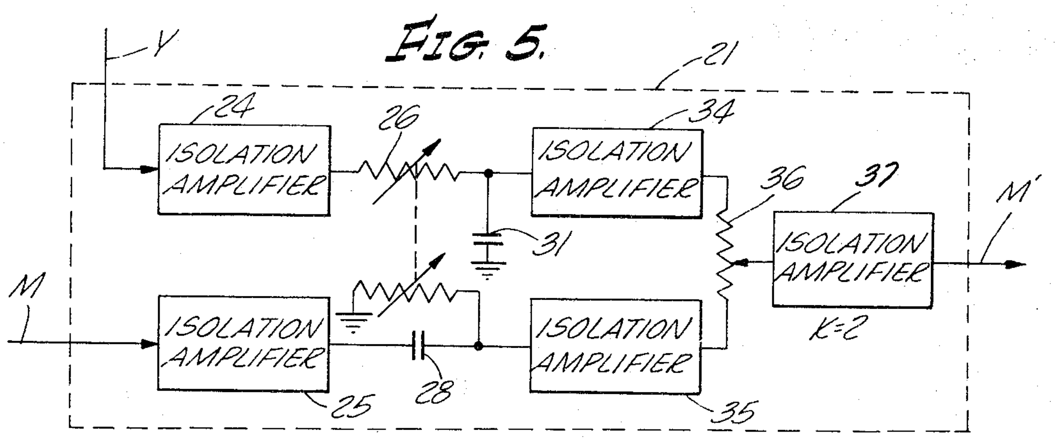
FIG. 5 is a schematic diagram of a fourth embodiment of the luminance corrector shown in FIG. 1.
Figure 6:
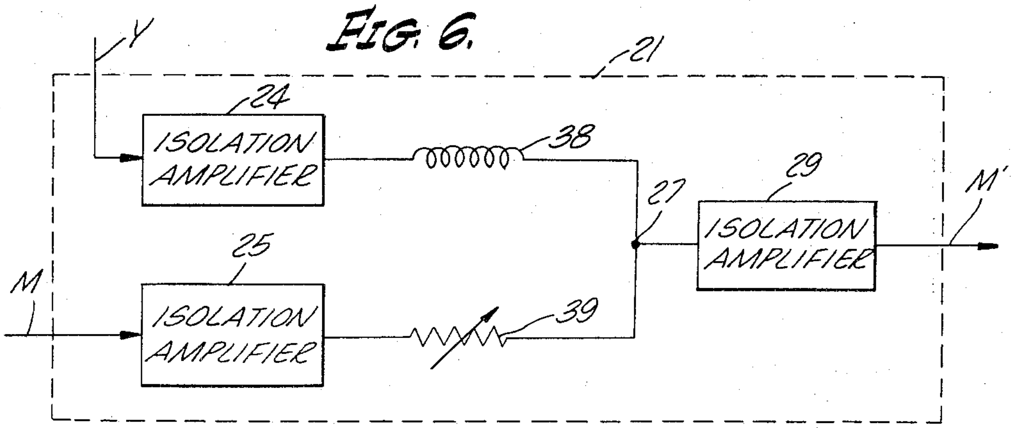
FIG. 6 is a schematic diagram of a fifth embodiment of the luminance corrector shown in FIG. 1.

The circuit of FIG. 5 is similar to the circuit of FIG. 4 with the exception that the summing amplifier 33 has been replaced by a pair of isolation amplifiers 34 and 35, a balancing potentiometer 36 and a further isolation amplifier 37 whose output is the signal M'. FIG. 6 shows the inductance-resistance equivalent of the RC circuit shown in FIG. 2. In FIG. 6, of course, the inductor 38 is positioned in the Y signal path while the adjustable resistor 39 is positioned in the M signal path.

Figures 7, 8:
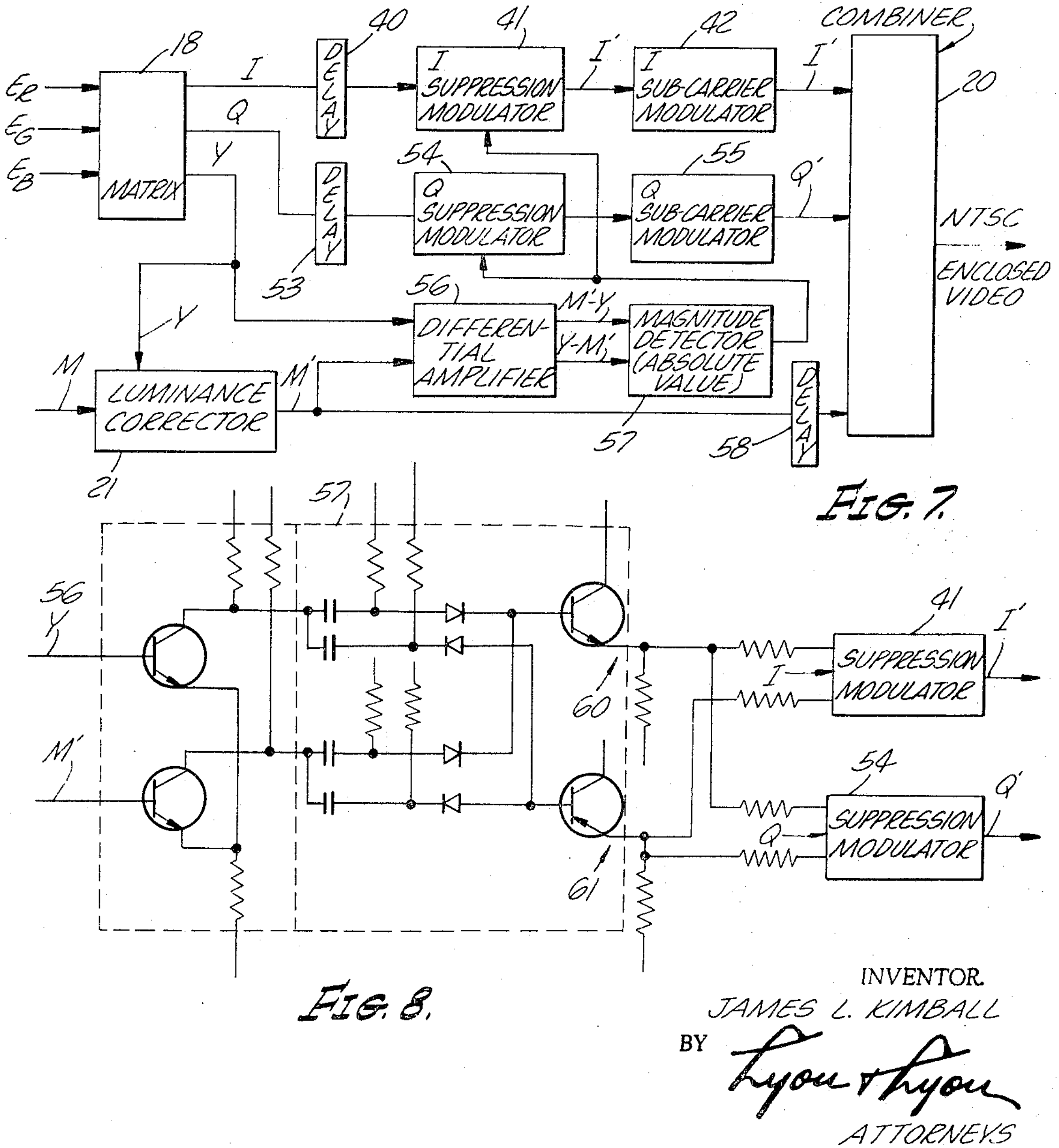
FIG. 7 is a block diagram of a modification of the system shown in FIG. 1.
FIG. 8 is a schematic diagram of a portion of the circuitry of FIG. 7.

When misregistration of the red, green and blue image conversion tubes occurs, false color fringes appear on objects. In some instances it is advantageous to suppress these chrominance errors although complete and abrupt suppression should generally be avoided. FIG. 7 shows a modification of the circuit of FIG. 1 which may be employed for this purpose. In FIG. 7, the $E_R$ $E_G$ and $E_B$ signals are fed into the matrix 18 which produces the output signals I, Q and Y. The I signal is fed through a delay 40 to an I suppression modulator 41. The output I' of the I suppression modulator 41 is then passed through an I subcarrier modulator 42 to the combiner 20. In a similar manner, the Q signal is passed through a delay 43, a Q suppression modulator 54 and a Q subcarrier modulator 55 to the combiner 20.

The Y signal is fed to the luminance corrector 21 and is also fed to one input of a differential amplifier 56, the other input of which is connected to the output of the luminance corrector 21. The differential amplifier 56 produces an output representing the absolute difference between M' and Y regardless of polarity. This output is fed to a magnitude detector 57, the output of which is fed to the I suppression modulator 41 and the Q suppression modulator 54 so as to reduce the modulator's outputs. The output M' of the luminance corrector 21 is fed through a delay line 58 to the combiner 20. The delays 40, 53 and 58 are not necessary but in general are desirable to provide delay equalization for optimum performance.

The circuit of FIG. 7 permits the suppressing of chroma information when the luminance signal derived from the RGB information differs from that resulting from the luminance corrected monochrome signal M'). Such differences will occur when luminance changes occur because of gamma differences between Y and M and because of misregistration and chroma changes. When such a difference signal occurs, the magnitude of the difference, or the square of the magnitude of the difference or any other function of the magnitude determines the degree of suppression of chroma information as determined by the makeup of the magnitude detector 57. The suppression modulators 41 and 54 may be of any form capable of passing an undistorted signal in the absence of a suppression signal. If desired, they may be combined with or may precede or succeed the I and Q modulators 42 and 55.

If desired, the circuit of FIG. 7 could be expanded to provide separate networks, such as those shown in FIG. 2, for the signals I and Q, and, of course, separate differential amplifiers, etc. so that the duration of suppression is separately controllable for I and Q. In this event, the three time constants, $T_2$, $T_Q$ and $T_Y$ should be inversely proportional to the band width of the I, Q, and Y signals. Such a proliferation of components and adjustments has been tried but has not been found to produce a proportional improvement.

FIG. 8 shows circuitry which can be used in the system of FIG. 7. The operation of this circuitry will be obvious to those skilled in the Art. Briefly stated, the emitter followers 60 and 61 driving the modulators 41 and 54 are biased through the resistors and diodes to operate each of the modulators at its unity transmission level. The balanced outputs of the differential amplifier 56 are coupled through the capacitors and diodes so as to reduce modulator output irrespective of the polarity of M' −Y. As shown, the suppression inputs of the modulators 41 and 54 are shown as balanced inputs while the signals are shown as unbalanced inputs. The modulators 41 and 54 themselves are conventional.

From the foregoing description it can be seen that a system has been provided that has the color rendition accuracy of a conventional three image conversion tube system during periods of constant luminance but which is capable of producing the resolution and fine detail of a four tube system during periods of changing luminance. While various circuits have been illustrated that are suitable for carrying out the present invention, other equivalent circuits will be apparent to those skilled in the art. The description of the invention is therefore intended to be illustrative only and not restrictive, the scope of the invention being indicated by the following claims.

I claim:

1. In a television color signal encoder having means for producing a monochrome signal, means for producing color signals, and means for deriving luminance and chrominance signals from said color signals, the improvement comprising means coupled to said monochrome signal producing means and said luminance signal deriving means for producing a modified luminance signal the characteristics of which are primarily determined by said luminance signal during steady state conditions and by said monochrome signal during changes in luminance.

2. The encoder of claim 1 wherein said modified luminance signal producing means comprises a time constant network.

3. The encoder of claim 2 wherein said time constant network comprises resistance means coupled to said luminance signal deriving means and capacitive means coupled to said monochrome signal producing means.

4. The encoder of claim 3 wherein the time constant of said time constant network is less than one microsecond.

5. In a television color signal encoder having a first image conversion device for producing a monochrome signal; second, third and fourth image conversion means for producing blue, red and green color signals; matrix means for forming I, Q and Y signals from said color signals; combiner means for producing an encoded color signal; and means for applying said I and Q signals to said combiner means, the improvement comprising: luminance corrector means for producing a modified luminance signal and having a first input for receiving said monochrome signal and a second input for receiving said Y signal whereby the characteristics of said modified luminance signal are primarily determined by said monochrome signal during periods of changing luminance and by said Y signal during periods of constant luminance.

6. The encoder of claim 5 wherein said luminance corrector means comprises a time constant network comprising resistance means coupled to said second input and capacitive means coupled to said first input.

7. The encoder of claim 6 wherein said resistance means is adjustable.

8. The encoder of claim 6 wherein the time constant of said time constant network is less than one microsecond.

9. The encoder of claim 6 wherein a percent correction potentiometer is provided between said inputs and said time constant network, said capacitive means being connected to the arm of said potentiometer.

10. The encoder of claim 6 wherein said resistance means has one end thereof coupled to said second input by first isolation amplifier means and said capacitive means has one end thereof coupled to said first input by second isolation amplifier means.

11. The encoder of claim 10 wherein the other end of said resistance means is coupled to ground through a capacitor and the other end of said capacitive means is coupled to ground through a resistor.

12. The encoder of claim 11 wherein a summing amplifier is provided and wherein the junction of said resistance means and said capacitor is coupled to one input of said summing amplifier and the junction of said capacitive means and said resistor is coupled to another input of said summing amplifier.

13. The encoder of claim 11 wherein a third isolation amplifier, a fourth isolation amplifier and a balancing means coupled to the outputs of said third and fourth isolation amplifiers and wherein the junction of said resistance means and said capacitor is coupled to the input of said third isolation amplifier and the junction of said capacitive means and said resistor is coupled to the input of said fourth isolation amplifier.

14. The encoder of claim 5 wherein said luminance corrector means comprises a time constant comprising inductance means coupled to said second input and resistive means coupled to said first input.

15. The encoder of claim 5 in which are provided: first suppression modulator means coupled to said matrix means and said combiner means for operating on said I signal; second suppression modulator means coupled to said matrix means and said combiner means for operating on said Q signal; differential amplifier means having a first input coupled to the Y signal output of said matrix means and a second input coupled to the output of said luminance corrector means, said differential amplifier means producing an output responsive to the difference between said Y signal and said modified luminance signal; and means coupled to said differential amplifier and to said first and second suppression modulator means, and responsive to the magnitude of said output of said differential amplifier to cause suppression of said I and Q signals.

16. The encoder of claim 15 wherein said luminance corrector means comprises a time constant network comprising resistance means coupled to said second input and capacitive means coupled to said first input.